United States Patent
Lim et al.

(10) Patent No.: US 12,019,738 B2
(45) Date of Patent: Jun. 25, 2024

(54) FAULT INJECTION ATTACK SYSTEM

(71) Applicant: KOOKMIN UNIVERSITY INDUSTRY ACADEMY COOPERATION FOUNDATION, Seoul (KR)

(72) Inventors: Han Sup Lim, Seoul (KR); Jong Hyeok Lee, Seoul (KR); Dong Guk Han, Seoul (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 280 days.

(21) Appl. No.: 17/512,675

(22) Filed: Oct. 28, 2021

(65) Prior Publication Data

US 2022/0129545 A1    Apr. 28, 2022

(30) Foreign Application Priority Data

Oct. 28, 2020    (KR) .................. 10-2020-0141542
Nov. 17, 2020    (KR) .................. 10-2020-0153419

(51) Int. Cl.
| | | |
|---|---|---|
| G06F 21/54 | (2013.01) | |
| G06F 21/55 | (2013.01) | |
| G06F 21/60 | (2013.01) | |
| G06F 21/85 | (2013.01) | |
| G06F 21/75 | (2013.01) | |

(52) U.S. Cl.
CPC ............ *G06F 21/54* (2013.01); *G06F 21/554* (2013.01); *G06F 21/602* (2013.01); *G06F 21/85* (2013.01); *G06F 21/755* (2017.08); *G06F 2221/034* (2013.01)

(58) Field of Classification Search
CPC ........ G06F 21/54; G06F 21/52; G06F 21/556; G06F 21/755; G06F 21/75; G06F 21/554; G06F 21/602; G06F 21/85; G06F 2221/034; G06F 2221/2123; G06F 21/577; G06F 2221/033
See application file for complete search history.

(56) References Cited

U.S. PATENT DOCUMENTS 10,606,943 B2 *    3/2020    Cunico .................. G06F 40/253

FOREIGN PATENT DOCUMENTS

| KR | 10-2012-0055218 A | 5/2012 |
| KR | 10-2015-0091691 A | 8/2015 |

OTHER PUBLICATIONS

Selmke et al ("Peak Clock: Fault Injection into PLL-Based Systems via Clock Manipulation", ASHES'19: Proceedings of the 3rd ACM Workshop on Attacks and Solutions in Hardware Security WorkshopNov. 2019pp. 85-94https://doi.org/10.1145/3338508.3359577) (Year: 2019).*

(Continued)

*Primary Examiner* — Alexander Lagor
*Assistant Examiner* — Brandon Binczak
(74) *Attorney, Agent, or Firm* — Nicholas Park

(57) ABSTRACT

Disclosed is a fault injection attack method including determining a trigger start point in time based on an input signal for a crypto device; determining a trigger end point in time based on an output signal of the crypto device; setting a trigger based on the trigger start point in time and the trigger end point in time; and performing a fault injection attack based on the set trigger.

3 Claims, 9 Drawing Sheets

(56) References Cited

OTHER PUBLICATIONS

Fakhire et al ("Vulnerability Analysis Against Fault Attack in terms of the Timing Behavior of Fault Injection," 2020 IEEE Computer Society Annual Symposium on VLSI (ISVLSI), Limassol, Cyprus, 2020, pp. 374-379, doi: 10.1109/ISVLSI49217.2020.00075) (Year: 2020).*

Putra et al ("Power analysis attack on implementation of DES," 2016 International Conference on Information Technology Systems and Innovation (ICITSI), Bandung, Indonesia, 2016, pp. 1-6, doi: 10.1109/ICITSI.2016.7858246) (Year: 2016).*

Dusart et al ("Differential Fault Analysis on A.E.S.," In: Zhou, J., Yung, M., Han, Y. (eds) Applied Cryptography and Network Security. ACNS 2003. Lecture Notes in Computer Science, vol. 2846. Springer, Berlin, Heidelberg. https://doi.org/10.1007/978-3-540-45203-4_23) (Year: 2003).*

Dusart, P.; Letourneux, G.; Vivolo, O. Differential fault analysis on AES. In International Conference on Applied Cryptography and Network Security; Springer: Berlin/Heidelberg, Germany, 2003, pp. 293-306.

HanSeop Lim, JongHyeok Lee and Dong-Guk Han, "Novel Fault Injection Attack without Artificial Trigger", Applied Sciences, 2020, 10(11), 3849.

JeaHoon Park, SangJae Moon, JaeCheol Ha, "Experimental Analysis of Optical Fault Injection Attack for CRT-RSA Cryptosystem", Journal of the Korea Institute of Information Security & Cryptology 19(3), Jun. 2009, pp. 51-59.

JeaHoon Park, KiSeok Bae, DooHwan Oh, SangJae Moon, JaeCheol Ha, "Fault Injection Attack on the For Statement In AES Implementation", Journal of the Korea Institute of Information Security & Cryptology 20(6), Dec. 2010, pp. 59-65.

* cited by examiner

[FIG. 1]
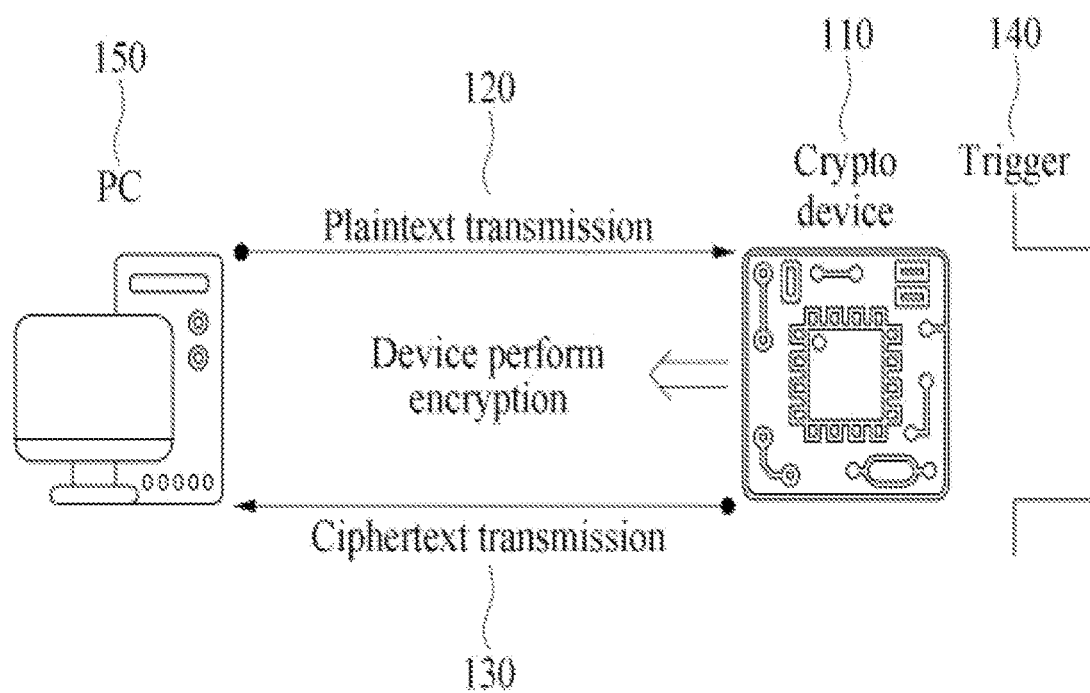

[FIG. 2]
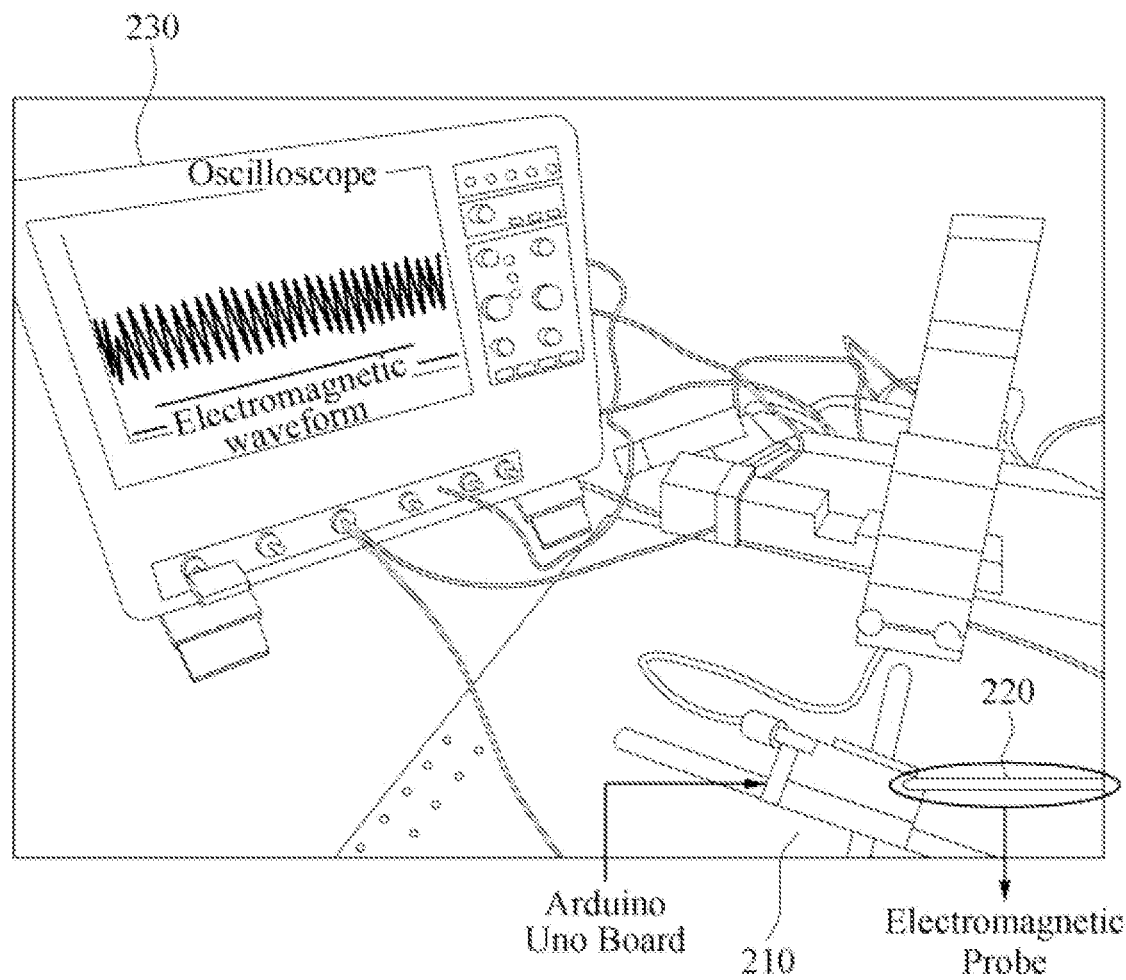

[FIG. 3]
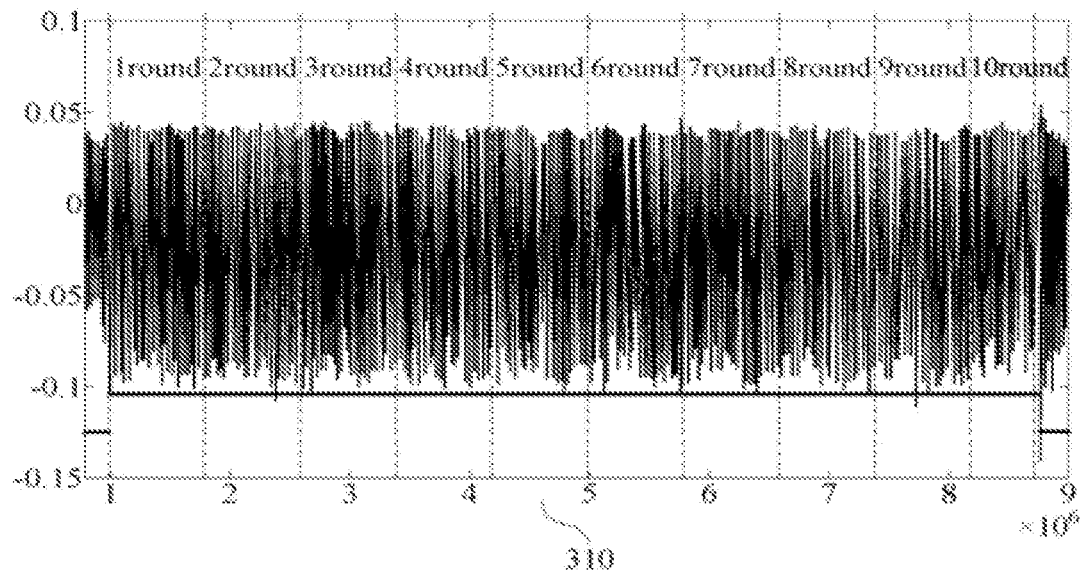
(a)
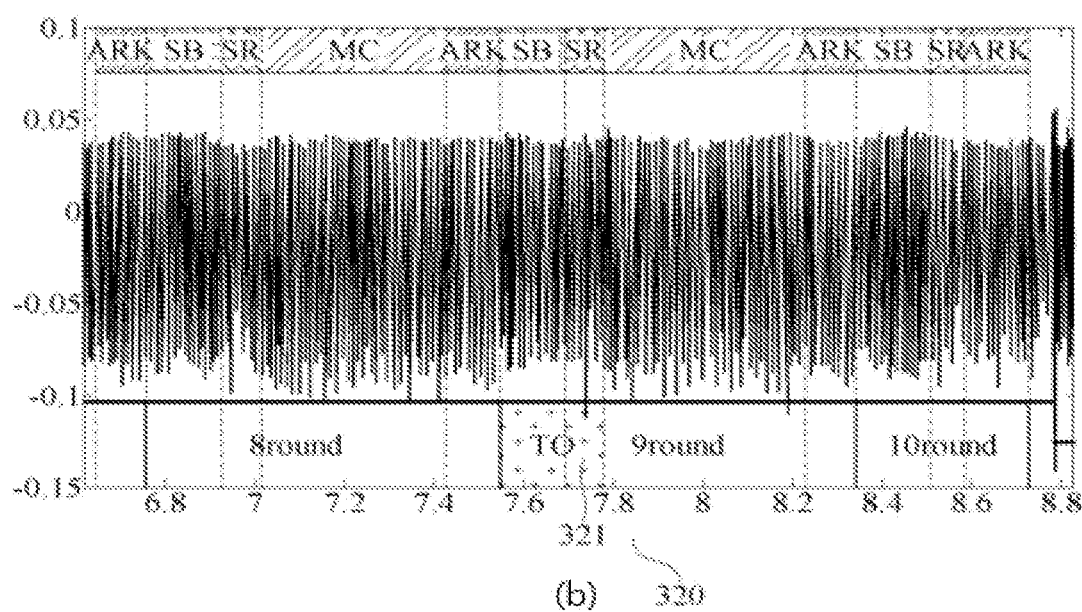
(b)

[FIG. 4]
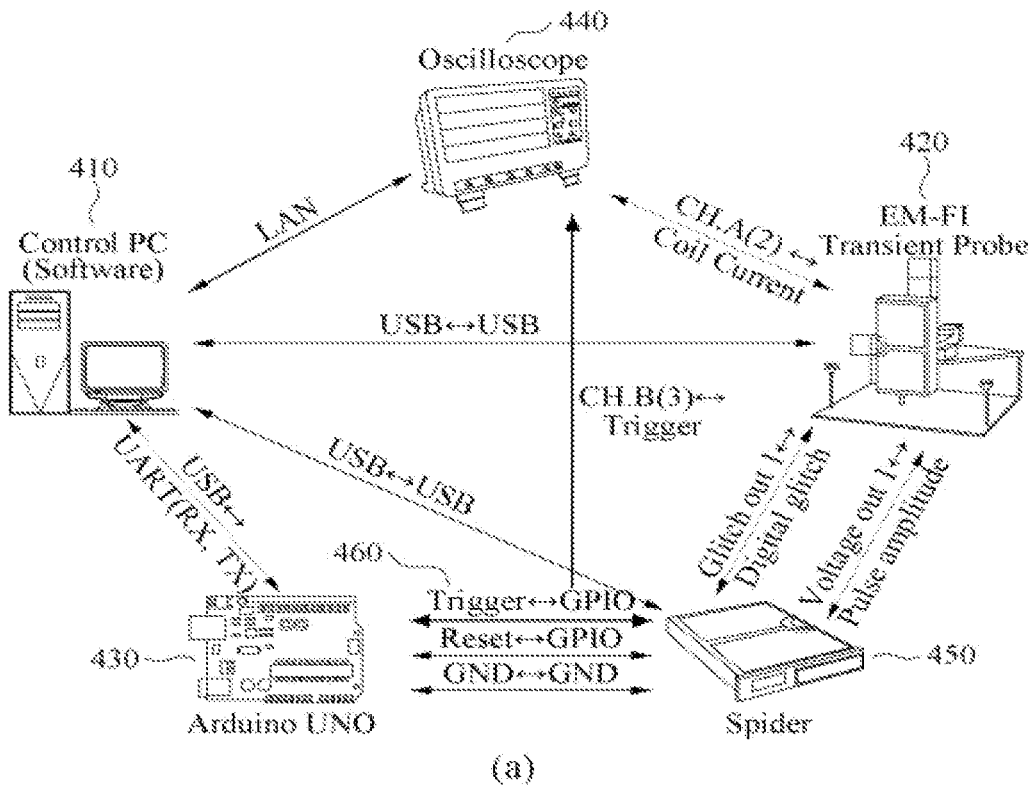
(a)
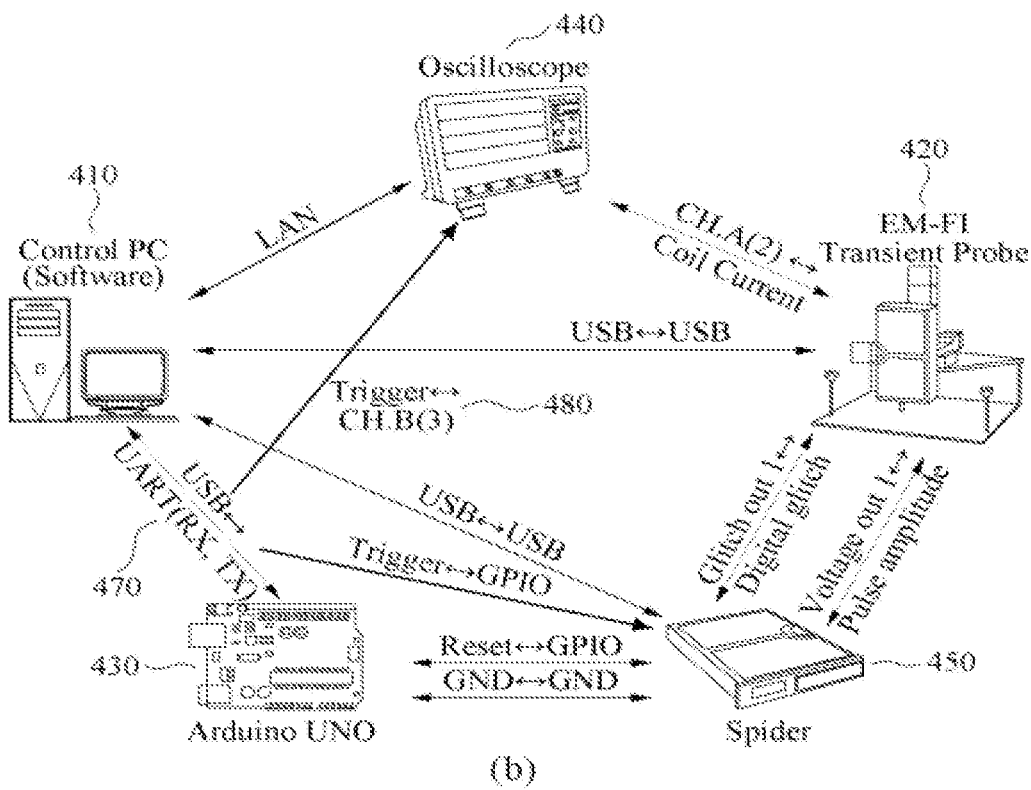
(b)

[FIG. 5]
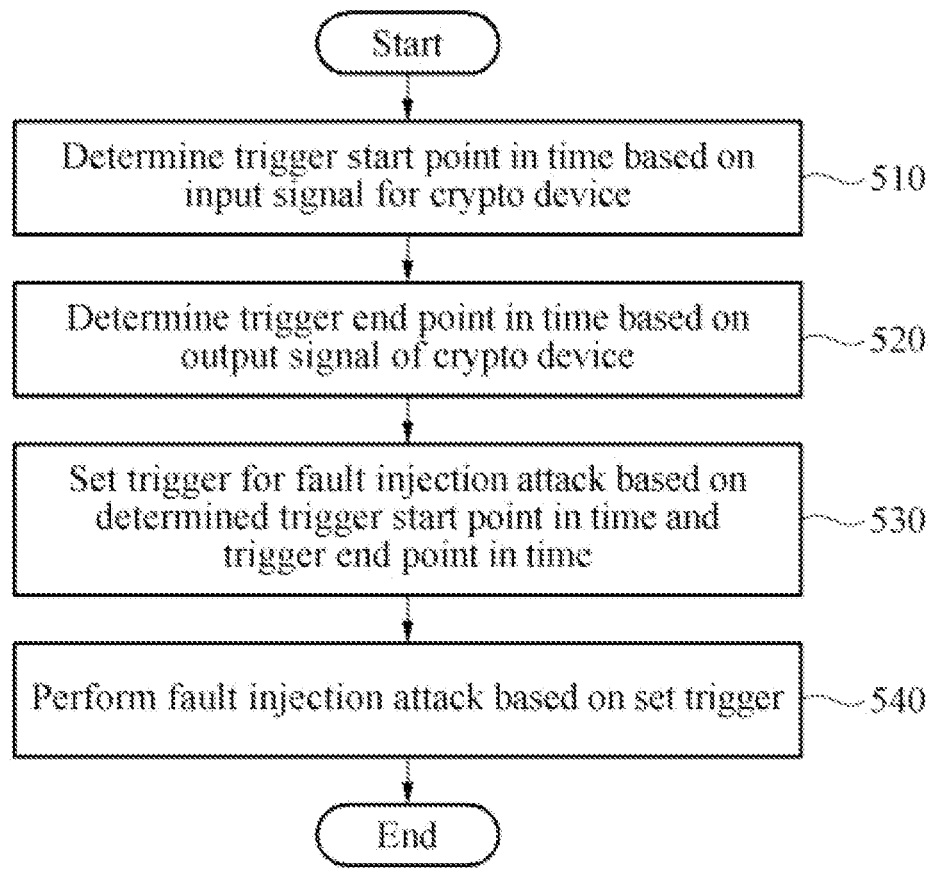

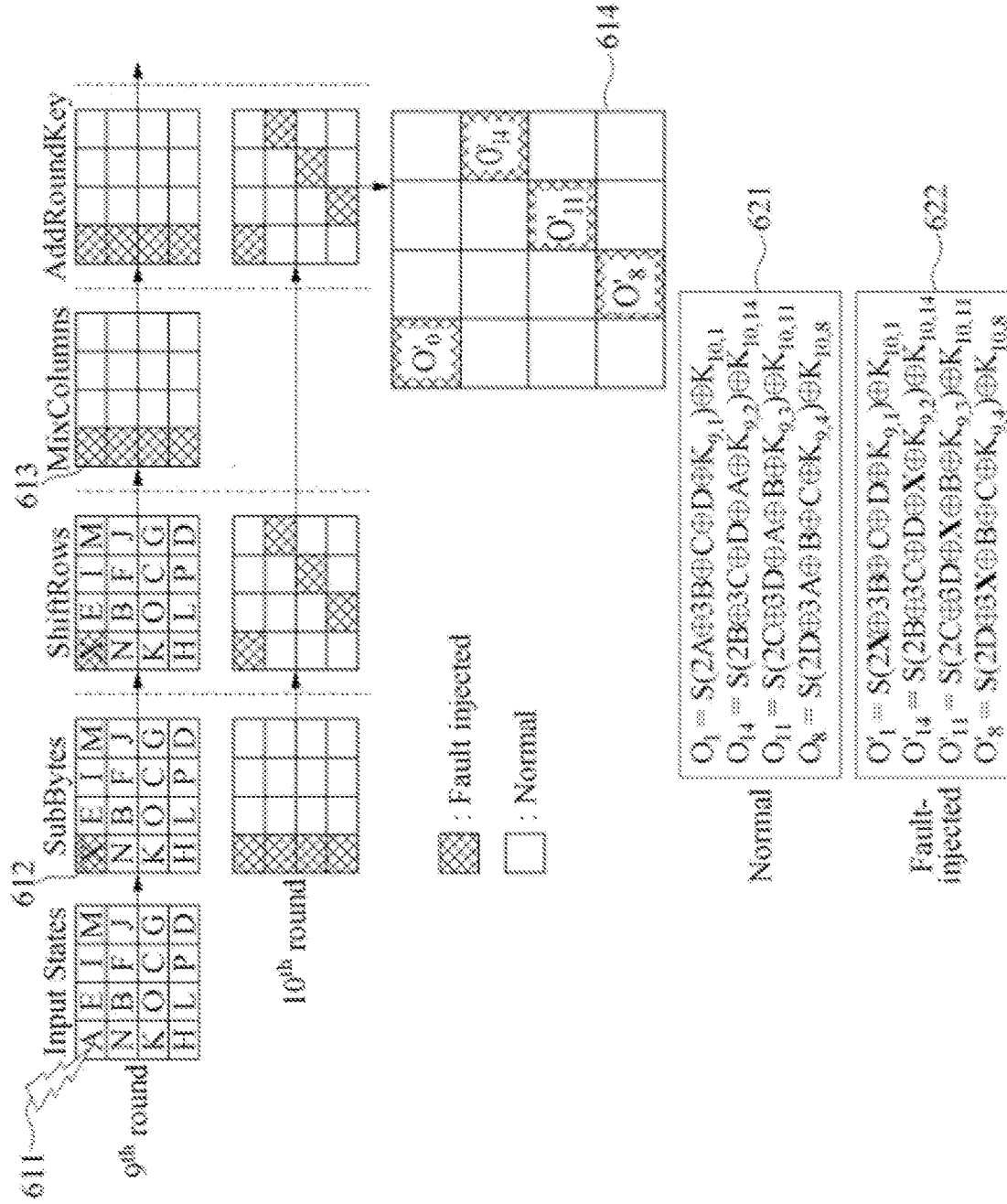
[FIG. 6]

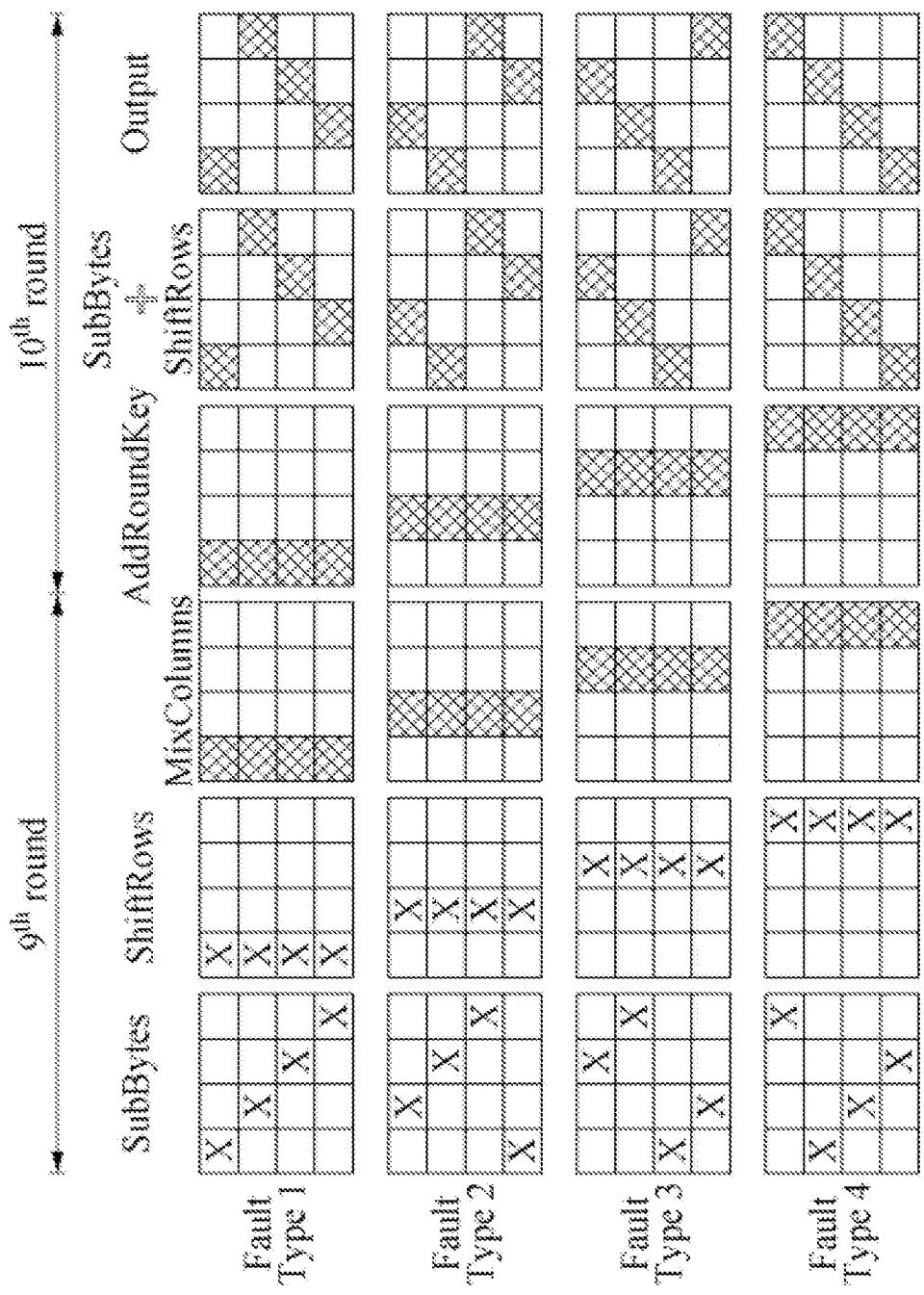
[FIG. 7]

[FIG. 8]

Input: sequence set of $C$, $C := \{C[0], C[1], ..., C[15]\}$.
  $C$ : Normal ciphertext
  $C_1', C_2', C_3'$ : Fault-injected ciphertext of the same Fault Type
  Fault Type : Fault Type $\in \{1, ..., 4\}$
  Fault-Injected Byte : Fault-injected input bytes corresponding Fault Type
    $Type_1\{1, 6, 11, 16\}, Type_2\{4, 5, 10, 15\}, Type_3\{3, 8, 9, 14\}, Type_4\{2, 7, 12, 13\}$
  $Y$ : Possible Guessing Value, $Y := (Y_0, Y_1, Y_2, Y_3)$, $(Y_i \in \{0, 255\}, 0 \leq i \leq 3)$
Output: $(K_0, K_1, K_2, K_3)$ : 4-byte 10th round keys
1: procedure DFA($C, C_1', C_2', C_3'$, Fault Type)
2:   initialize $Y$ to all of guessing values
3:   $T \leftarrow$ Fault Type
4:   for $i = 0$ to 3 do
5:     $M \leftarrow$ PGO_DFA ($C, C_1', Type_T[i], Y$)
6:     for $j = 0$ to 3 do
7:       $N \leftarrow$ PGO_DFA($C, C_2', Type_T[j], M$)
8:       for $k = 0$ to 3 do
9:         $O \leftarrow$ PGO_DFA ($C, C_3', Type_T[k], N$)
10:        if $O \neq$ NULL then
11:          $K_0 \leftarrow S(Y_0)$ xor $C[x_0]$
12:          $K_1 \leftarrow S(Y_1)$ xor $C[x_1]$
13:          $K_2 \leftarrow S(Y_2)$ xor $C[x_2]$
14:          $K_3 \leftarrow S(Y_3)$ xor $C[x_3]$
15:          return $(K_0, K_1, K_2, K_3)$
16:   return FAILED
17: end procedure

[FIG. 9]
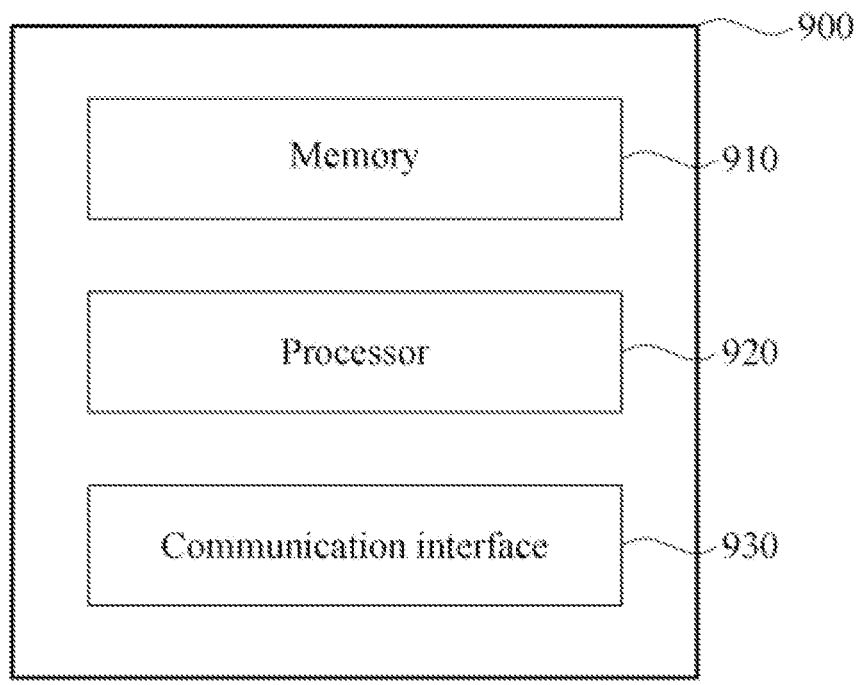

FAULT INJECTION ATTACK SYSTEM

CROSS-REFERENCE TO RELATED APPLICATION

This application claims priority to and the benefit of Korean Patent Application No. 10-2020-0141542, filed on Oct. 28, 2020, and Korean Patent Application No. 10-2020-0153419, filed on Nov. 17, 2020, the disclosure of which is incorporated herein by reference in its entirety.

BACKGROUND

1. Technical Field

The following example embodiments relate to a fault injection attack system.

2. Related Art

A differential fault analysis (DFA) refers to a method of analyzing an encryption algorithm using a difference between a normal ciphertext generated by a system and an abnormal ciphertext obtained through a fault injection attack for the same plaintext.

A theoretical DFA recovers a secret key used for encryption using a fault-injected ciphertext and a normal ciphertext with the assumption that a fault is injected at a position desired by an attacker. To obtain the fault-injected ciphertext at a desired point in time with a high success rate, an artificial trigger needs to be set at a point in time at which a specific operation is performed. The aforementioned artificial trigger may be set by correcting a code mounted in encryption equipment. Here, when performing an analysis on actual encryption equipment, it is practically very difficult to set the trigger through a code revision at a point in time corresponding to a specific operation. In particular, if target equipment is a complete product, a code correction may not be an appropriate solution in a practical scenario.

3. Prior Art

Reference includes a non-patent document "Dusart, P.; Letourneux, G.; Vivolo, O. Differential fault analysis on AES. In International Conference on Applied Cryptography and Network Security; Springer: Berlin/Heidelberg, Germany, 2003, pp.293-306."

SUMMARY

1. Technical Subject

The present disclosure relates to a communication control method and an apparatus using the same. Since it is realistically difficult to set an artificial trigger at the point in time when a specific operation is performed, as in the existing method, the purpose of the present invention is to provide a method for performing a fault injection attack by applying a more relieved trigger.

2. Solution

An aspect is to provide a method of performing a fault injection attack by applying a more relaxed trigger since it is practically difficult to set an artificial trigger at a point in time at which a specific operation is performed as in an existing scheme.

According to an aspect of an example embodiment, there is provided a fault injection attack method performed by a computing apparatus, the fault injection attack method including determining a trigger start point in time based on an input signal for a crypto device; determining a trigger end point in time based on an output signal of the crypto device; setting a trigger based on the trigger start point in time and the trigger end point in time; and performing a fault injection attack based on the set trigger.

The trigger start point in time may be determined as a point in time at which a plaintext is input to the crypto device, based on the input signal.

The trigger end point in time may be determined as a point in time at which a ciphertext is output from the crypto device, based on the output signal.

A target operation that is a target of the fault injection attack may be determined based on an analysis for electromagnetic trace (electromagnetic wave waveform) emitted in a process in which the crypto device performs encryption.

According to an aspect of an example embodiment, there is provided a communication interface; and a processor. The processor is configured to determine a trigger start point in time based on an input signal for a crypto device, determine a trigger end point in time based on an output signal of the crypto device, set a trigger based on the trigger start point in time and the trigger end point in time, and perform a fault injection attack based on the set trigger.

The performing of the fault injection attack may include recovering a secret key based on an XOR operation between a normal ciphertext and a fault-injected erroneous ciphertext. The recovering may include recovering the secret key by performing an analysis on a number of all cases related to a position at which a fault is likely to be injected for each fault type.

BRIEF DESCRIPTION OF THE FIGURES

Example embodiments will be described in more detail with reference to the following figures that are simply a portion of the example embodiments and one of ordinary skill in the art to which this disclosure pertains (hereinafter, one of ordinary skill in the art) may readily acquire other figures based on the figures without an inventive work being made:

FIG. 1 illustrates a communication process between a computing apparatus performing a fault injection attack and encryption equipment in a process of applying the fault injection attack according to an example embodiment;

FIG. 2 illustrates an example of applying a simple power analysis (SPA) to specify an attack target operation for a fault injection attack according to an example embodiment;

FIG. 3 illustrates an example of specifying a target operation of a fault injection attack based on an analysis of electromagnetic trace(electromagnetic wave waveform) according to an example embodiment;

FIG. 4 illustrates a configuration of an existing fault injection attack system and a configuration of a fault injection attack system according to an example embodiment;

FIG. 5 is a flowchart illustrating a fault injection attack method performed by a computing apparatus according to an example embodiment;

FIG. 6 illustrates an example of describing a method of recovering a secret key through a differential fault attack (DFA) in an advanced encryption standard (AES);

FIG. 7 illustrates an example of describing a method of recovering, by a computing apparatus performing a fault injection attack method, a secret key according to an example embodiment;

FIG. 8 illustrates an example of an algorithm code for recovering a secret key in a fault injection attack according to an example embodiment; and FIG. 9 is a diagram illustrating an example of a computing apparatus performing a fault injection attack method according to an example embodiment.

DETAILED DESCRIPTION

The following detailed description of this disclosure is described with reference to the accompanying drawings in which specific example embodiments of the disclosure are illustrated as examples, to fully describe purposes, technical solutions, and advantages of the disclosure. The example embodiments are described in detail enough for one of ordinary skill in the art to carry out the disclosure.

Also, the terms "comprises/includes" used throughout the detailed description and the claims and modifications thereof are not intended to exclude other technical features, additions, components, or operations. Also, "single" or "one" is used to indicate at least one and "another" is limited to at least second or more.

Also, terms, such as first, second, and the like, used herein are used only to distinguish one component from another component and thus, the scope of the disclosure is not limited to or restricted by the terms unless indicated otherwise. For example, a first component may be referred to as a second component, or similarly, the second component may be referred to as the first component within the scope of the disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly accessed" to another component, still other component may not be present therebetween. Likewise, expressions, for example, "between" and "immediately between" and "adjacent to" and "immediately adjacent to" may also be construed as described in the foregoing.

In each of operations, identification symbols, for example, a, b, c, etc., are used for convenience of description and the identification symbols do not describe order of the respective operations unless it necessarily results in logic and each of the operations may occur out of specified order. That is, each of the operations may occur in the same order as specified, may be substantially simultaneously performed, and may be performed in reverse order.

One of ordinary skill in the art may clearly understand a portion of other purposes, advantages, and features of the disclosure from this specification and another portion thereof from implementations of the disclosure. The following examples and drawings are provided as examples only and not to limit the disclosure. Therefore, the detailed description disclosed herein should not be interpreted as a limiting meaning with respect to a specific structure or function and should be interpreted as representative basic data that provides guidelines such that one of ordinary skill in the art may variously implement the disclosure as substantially suitable detailed structures.

Further, the disclosure may include any possible combinations of example embodiments described herein. It should be understood that, although various example embodiments differ from each other, they do not need to be exclusive. For example, a specific shape, structure, and feature described herein may be implemented as another example embodiment without departing from the spirit and scope of the disclosure. Also, it should be understood that a position or an arrangement of an individual component of each disclosed example embodiment may be modified without departing from the spirit and scope of the disclosure. Accordingly, the following detailed description is not to be construed as being limiting and the scope of the disclosure, if properly described, is limited by the claims, their equivalents, and all variations within the scope of the claims. In the drawings, like reference numerals refer to like elements throughout.

Unless the context clearly indicates otherwise, the singular forms "a," "an," and "the," are intended to include the plural forms as well. Also, when description related to a known configuration or function is deemed to render the present disclosure ambiguous, the corresponding description is omitted.

Hereinafter, the example embodiments are described in detail with reference to the accompanying drawings such that one of ordinary skill in the art may easily perform the example embodiments.

FIG. 1 illustrates a communication process between a computing apparatus performing a fault injection attack and encryption equipment in a process of applying the fault injection attack according to an example embodiment.

Referring to FIG. 1, a crypto device 110 may receive an input 120 of a plaintext from a computing apparatus 150 and may output 130 a ciphertext obtained by performing encryption on the received plaintext. The computing apparatus 150 that performs a fault injection attack for the crypto device 110 may set a trigger 140 in which a point in time at which the plaintext is input 120 is set as a trigger start point in time and a point in time at which the crypto device 110 outputs 130 the ciphertext is set as a trigger end point in time. That is, the computing apparatus 150 that performs a fault injection attack for the crypto device 110 may set the trigger 140 using an input/output signal transmitted and received between the crypto device 110 and the computing apparatus 150 without revising a code in the crypto device 110. Through this, a fault injection attack method according to an example embodiment may alleviate assumption of the existing method that needs to revise a code in the crypto device 110 for an artificial trigger setting.

In a fault injection attack method according to an example embodiment, since a trigger is set for the entire encryption operation of the crypto device 110, it may be difficult to specify an operation to be attacked, that is, an attack target operation. Therefore, to specify a position (a point in time) of the attack target operation, the present disclosure may apply a scheme of specifying a target to be attacked, that is, an attack target by applying a simple power analysis (SPA). Although a scheme of applying the fault injection attack method according to an example embodiment is described herein based on an advanced encryption standard (AES) algorithm, it will be apparent to one of ordinary skill in the art that the fault injection attack may be applied to any encryption algorithm without being limited to the AES algorithm.

FIG. 2 illustrates an example of applying a simple power analysis (SPA) to specify an attack target operation for a fault injection attack according to an example embodiment.

Referring to FIG. 2, a trigger based on an input/output (I/O) signal described above with reference to FIG. 1 may be set to a crypto device 210 implemented on a board and an encryption operation may be repeatedly performed. To specify an operation to be attacked, that is, an attack target operation, an electromagnetic trace of the crypto device 210 may be monitored through a probe 220 and an oscilloscope 230. The attack target operation may be specified in a process in which encryption is in progress through analysis of electromagnetic trace generated in a process in which the crypto device 210 performs encryption. For example, a point in time at which the attack target operation is performed may be specified based on the electromagnetic trace generated in the process of performing the attack target operation and the fault injection attack may be performed by injecting a fault at the corresponding point in time.

FIG. 3 illustrates an example of specifying a target operation of a fault injection attack based on an analysis of electromagnetic trace according to an example embodiment.

(a) of FIG. 3 may refer to a trace 310 that is an electromagnetic trace of the crypto device 210 monitored through the oscilloscope 230 of FIG. 2 and an electromagnetic trace emitted from the crypto device 210 in a process in which encryption is in progress to an AES. A fault injection attack method according to an example embodiment may specify an operation to be attacked through analysis of electromagnetic trace emitted from the crypto device 210 in an encryption process and may perform a fault injection attack for the specified operation.

A different operation to be attacked may be specified according to the fault injection attack method. For example, to obtain a key value of a 10th round, SubBytes and ShiftRows operations of a 9-th round may be operations to be attacked, that is, attack target operations. Referring to (b) of FIG. 3, a computing apparatus 150 may specify a point in time (655 μs~675 μs) at which an attack target operation 321 is performed from an electromagnetic trace 320 through an electromagnetic trace analysis of the crypto device 210 and may inject a fault at the specified point in time.

FIG. 4 illustrates a configuration of an existing fault injection attack system and a configuration of a fault injection attack system according to an example embodiment.

(a) of FIG. 4 may refer to an existing fault injection attack system and (b) of FIG. 4 may refer to a fault injection attack system proposed herein.

Each of the fault injection attack systems corresponding to (a) and (b) may include a computing apparatus (Control PC) 410 configured to monitor a fault injection attack, a probe 420 configured to perform an electromagnetic fault injection, a board 430 on which a crypto device that is a target of the fault injection attack is implemented, an oscilloscope 440 configured to perform an electromagnetic trace analysis to determine a position at which the fault injection attack is to be performed, and a channel controller 450 configured to control a communication channel between the computing apparatus 410 and the board 430.

An additional connection 460 between the board 430 and the channel controller 450 is essentially required to perform a trigger in the existing fault injection attack system. On the contrary, in an example embodiment, a trigger for a fault injection attack may be set using a connection (470) between the computing apparatus 410 and the board 430. The example embodiment may minimize deformation of the board 430 by performing a fault injection attack through a jump connection 480. In detail, through the fault injection attack of the example embodiment, it is possible to provide a method capable of performing the trigger without modifying an internal code of the board 430 for an artificial trigger setting.

FIG. 5 is a flowchart illustrating a fault injection attack method performed by a computing apparatus according to an example embodiment.

Referring to FIG. 5, in operation 510, the computing apparatus may determine a trigger start point in time based on an input device for a crypto device. The computing apparatus may determine, as the trigger start point in time, a point in time at which a plaintext is input to the crypto device that is determined based on the input signal.

In operation 520, the computing apparatus may determine a trigger end point in time based on an output signal of the crypto device. The computing apparatus may determine, as the trigger end point in time, a point in time at which a ciphertext is output that is determined based on the output signal of the crypto device.

In operation 530, the computing apparatus may set a trigger for performing a fault injection attack based on the determined trigger start point in time and trigger end point in time.

In operation 540, the computing apparatus may perform the fault injection attack based on the set trigger.

A method of recovering a secret key through a fault injection attack is further described with reference to FIGS. 6 and 7.

FIG. 6 illustrates an example of describing a method of recovering a secret key through a differential fault attack (DFA) in an advanced encryption standard (AES) according to an example embodiment.

The method of recovering a secret key by applying a DFA in an AES is disclosed in a non-patent document "Dusart, P.; Letourneux, G.; Vivolo, O. Differential fault analysis on AES. In International Conference on Applied Cryptography and Network Security; Springer: Berlin/Heidelberg, Germany, 2003, pp.293-306."

Hereinafter, the method of recovering a secret key is further described with reference to FIG. 6.

FIG. 6 illustrates a situation in which a fault is propagated when a fault is injected into a first byte of input of a $9^{th}$ round. In detail, when a fault 611 is injected into a first byte 611 of input of the $9^{th}$ round, the fault 611 may be propagated to a first byte 612 of SubBytes operation performance results and may be propagated to a first column 613 of MixColumns operation performance results.

An injected fault may be propagated in the course of a $10^{th}$ round and finally propagated as 4 bytes corresponding to a red area in an output ciphertext 614.

When a fault is not injected, an output value may be expressed as a formula 621. When a fault is injected, an output value may be expressed as a formula 622.

Normal output $O_1$ and faulty output $O'_1$ may be expressed as the following Formula 1 and Formula 2, respectively.

$$S(2A \oplus 3B \oplus C \oplus D \oplus K_{9,1}) \oplus K_{10,1} = O_1 \qquad \text{[Formula 1]}$$

$$S(2X \oplus 3B \oplus C \oplus D \oplus K_{9,1}) \oplus K_{10,1} = O'_1 \qquad \text{[Formula 2]}$$

Here, S denotes an Sbox operation that performs a SubBytes operation, A denotes a first byte value of $9^{th}$ round MixColumns operation input, B denotes a second byte value of the $9^{th}$ round MixColumns operation input, C denotes a third byte value of the $9^{th}$ round MixColumns operation input, D denotes a fourth byte value of the $9^{th}$ round MixColumns operation, X denotes a first byte value of the $9^{th}$ round MixColumns operation that is modified based on a fault injection, $\oplus$ denotes an XOR operation, $K_{i,j}$ denotes a $j^{th}$ byte round key of an $i^{th}$ round, $O'_1$ denotes a first fault value propagated according to a fault injection, and $O_1$ denotes a normal output value corresponding to a position of $O'_1$.

Through the XOR operation of Formula 1 and Formula 2, $K_{11,1}$ may be neutralized. A result of the XOR operation between $O_1$ and $O'_1$, that is, $\mu_1$ may be represented as Formula 3. Formula 3 may be briefly expressed as Formula 4.

$$S(2A \oplus 3B \oplus C \oplus D \oplus K_{9,1}) \oplus S(2 \oplus 3B \oplus C \oplus D \oplus K_{9,1}) = O_1 \oplus O'_1 = \mu_1 \quad \text{[Formula 3]}$$

$$S(Y_0) \oplus S(2Z \oplus Y_0) = \mu_1 (Z = A \oplus X, Y_0 = 2A \oplus 3B \oplus C \oplus D \oplus K_{9,1}) \quad \text{[Formula 4]}$$

Likewise, if the same operation as Formula 4 is expressed for other fault values propagated based on the injected fault, the following Formula 5 to Formula 7 may be obtained.

$$S(Y_1) \oplus S(Z \oplus Y_0) = \mu_{14} (Z = A \oplus X, Y_1 = A \oplus 2B \oplus 3C \oplus D \oplus K_{9,2}) \quad \text{[Formula 5]}$$

$$S(Y_2) \oplus S(Z \oplus Y_0) = \mu_{11} (Z = A \oplus X, Y_2 = A \oplus B \oplus 2C \oplus 3D \oplus K_{9,3}) \quad \text{[Formula 6]}$$

$$S(Y_3) \oplus S(3Z \oplus Y_0) = \mu_8 (Z = A \oplus X, Y_3 = 3A \oplus B \oplus C \oplus 2D \oplus K_{9,4}) \quad \text{[Formula 7]}$$

$\mu_{14}$ may represent an XOR operation result between $O_{14}$ and $O'_{14}$, $\mu_{11}$ may represent an XOR operation result between $O_{11}$ and $O'_{11}$, and $\mu_8$ may represent an XOR operation result between $O_8$ and $O'_8$.

The computing apparatus may retrieve a pair of $(Y_0, Z)$ that satisfies Formula 4 based on a known value of $\mu_1$. Since the SubBytes operation is a nonlinear function, the range of guessing values of $Z$ may iteratively decrease based on formulas for pairs of $(Y_1, Z)$, $(Y_2, Z)$, and $(Y_3, Z)$. As only some $Z$ values simultaneously satisfy Formula 4, the range of guessing values of $Y_0, Y_1, Y_2, Y_3$ corresponding to the range of $Z$ may decrease.

The above guessing operations may be repeated using other fault-injected ciphertexts. In this process, only values of $Y_0, Y_1, Y_2, Y_3$ of which the range of guessing values is narrowed may be considered. The computing apparatus may repeat the above process until the respective values of $Y_0, Y_1, Y_2, Y_3$ are recovered. The computing apparatus may assume that other faults are injected at the same position and, when ciphertexts injected with different three faults and a normal ciphertext are obtained, the computing apparatus may obtain accurate values of $Y_0, Y_1, Y_2, Y_3$. The computing apparatus may obtain values of $K_{10,1}, K_{10,14}, K_{10,11}, K_{10,8}$ through Formula 8 by recovering the respective values of $Y_0, Y_1, Y_2, Y_3$.

$$S(Y_0) \oplus K_{10,1} = O_1, S(Y_1) \oplus K_{10,14} = O_{14}, S(Y_2) \oplus K_{10,11} = O_{11}, S(Y_3) \oplus K_{10,8} = O_8 \quad \text{[Formula 8]}$$

A secret key may be obtained based on values of $K_{10,1}, K_{10,14}, K_{10,11}, K_{10,8}$.

FIG. 7 illustrates an example of describing a method of recovering, by a computing apparatus performing a fault injection attack method, a secret key according to an example embodiment.

The computing apparatus according to an example embodiment sets a trigger through an existing input signal. Therefore, it may be difficult to accurately detect a working time of an attack target operation compared to an existing method of providing an artificial trigger. In a fault injection attack method according to an example embodiment, the computing apparatus may provide a method capable of analyzing a secret key without knowing a fault-injected byte.

FIG. 7 illustrates a fault propagation to various rows of MixColumns operation results by a fault. A fault type may be classified through a ciphertext affected by a fault injection. For example, the fault type may be classified into four types depending on to which row a fault is propagated in MixColumns operation results. For example, a case of a fault corresponding to fault type 1 may correspond to a case in which a fault is injected at a position of one of $1^{st}$ byte, $6^{th}$ byte, $11^{th}$ byte, and $16^{th}$ byte in SubBytes operation results.

Table 1 may represent a formula for an XOR operation value between a normal output and a fault-generated output for various cases in which fault type 1 is generated.

TABLE 1

| Fault Byte | Formula Type |
|---|---|
| 1 | $S(Y_0) \oplus S(2Z \oplus Y_0) = U_1$ |
|   | $S(Y_1) \oplus S(Z \oplus Y_1) = U_{14}$ |
|   | $S(Y_2) \oplus S(Z \oplus Y_2) = U_{11}$ |
|   | $S(Y_3) \oplus S(3Z \oplus Y_3) = U_8$ |
| 6 | $S(Y_0) \oplus S(3Z \oplus Y_0) = U_1$ |
|   | $S(Y_1) \oplus S(2Z \oplus Y_1) = U_{14}$ |
|   | $S(Y_2) \oplus S(Z \oplus Y_2) = U_{11}$ |
|   | $S(Y_3) \oplus S(Z \oplus Y_3) = U_8$ |
| 11 | $S(Y_0) \oplus S(Z \oplus Y_0) = U_1$ |
|   | $S(Y_1) \oplus S(3Z \oplus Y_1) = U_{14}$ |
|   | $S(Y_2) \oplus S(2Z \oplus Y_2) = U_{11}$ |
|   | $S(Y_3) \oplus S(Z \oplus Y_3) = U_8$ |
| 16 | $S(Y_0) \oplus S(Z \oplus Y_0) = U_1$ |
|   | $S(Y_1) \oplus S(Z \oplus Y_1) = U_{14}$ |
|   | $S(Y_2) \oplus S(3Z \oplus Y_2) = U_{11}$ |
|   | $S(Y_3) \oplus S(2Z \oplus Y_3) = U_8$ |

Referring to Table 1, different coefficients for $Z$ values may be present according to a fault-injected position even for the same fault type.

When a fault injection attack is normally performed, a number of a fault-injected row may be verified using only a fault-injected ciphertext. However, a fault-injected byte may not be verified. Therefore, the computing apparatus according to an example embodiment may recover a secret key by performing an analysis on a number of all cases related to a position at which a fault is likely to be injected for each fault type. In detail, the computing apparatus may verify the fault-injected byte by performing an analysis for four cases for each fault type as represented by Table 1.

Through the method described above with reference to FIG. 6, the computing apparatus may narrow the range of guessing values of $Y_0, Y_1, Y_2, Y_3$ and may recover the respective values of $Y_0, Y_1, Y_2, Y_3$ using three ciphertexts injected with different faults.

Through the recovered values of $Y_0, Y_1, Y_2, Y_3$ the computing apparatus may recover the respective secret keys according to Equation 8.

FIG. 8 illustrates an example of an algorithm code for recovering a secret key in a fault injection attack according to an example embodiment.

Referring to FIG. 8, a defined differential fault analysis (DFA) function may refer to a function that outputs round keys $K_0, K_1, K_2, K_3$ by using, as an input, a normal ciphertext $C$, fault-injected ciphertexts $C'_1, C'_2, C'_3$ that are obtained by injecting different faults, and guessing values $Y_0, Y_1, Y_2, Y_3$ for limiting range and fault type $\text{Type}_T$, and may refer to an algorithm (lines 4 to 9) in which the method of FIG. 6 is implemented.

In the algorithm, "Normal Ciphertext" represents a normal ciphertext used for analysis, "Faulted Ciphertext" represents a fault-injected ciphertext used for analysis, "Fault-Injected Byte" represents an analysis formula (e.g., Formula 4 to Formula 7) corresponding to an array that includes a fault-injected input byte according to a fault type, and "Guessing Value" represents a pair of $Y_0$, $Y_1$, $Y_2$, $Y_3$ for reducing the range of guessing values.

The computing apparatus may determine a fault type by checking, in a ciphertext, a byte affected based on a fault prior to applying the algorithm, for example, the DFA algorithm, of FIG. 8. Here, referring to Table 1, a fault-injected byte may be different even for the same fault type. Therefore, the fault type $Type_T$ may be represented in a form of an array. Here, the array may include an index capable of identifying a fault-injected byte. As for a formula applied to the DFA, a different formula may be applied according to a position at which a fault is injected even for the same fault type $Type_T$.

Lines 10 to 15 of the algorithm may represent that a secret key is recoverable when $Y_0$, $Y_1$, $Y_2$, $Y_3$ are determined as a single value. That is, when a fault-injected byte is accurately guessed for each fault-injected ciphertext, a secret key may be accurately recovered. However, when a fault-injected byte is inaccurately guessed, a correct secret key may not be recovered.

Also, $\alpha_0$, $\alpha_1$, $\alpha_2$, $\alpha_3$ may represent indices of ciphertext bytes in a ciphertext based on an injected fault.

When three fault-injected ciphertexts are considered for each fault type, the computing apparatus may recover a 10-th round key comprised of 16 bytes.

FIG. 9 is a diagram illustrating an example of a computing apparatus performing a fault injection attack method according to an example embodiment.

Referring to FIG. 9, a computing apparatus 900 includes a processor 920. The computing apparatus 900 may further include a memory 910 and a communication interface 930. The processor 920, the memory 910, and the communication interface 930 may communicate with each other through a communication bus (not shown).

The processor 920 may determine a trigger start point in time based on an input signal for a crypto device, determine a trigger end point in time based on an output signal of the crypto device, set a trigger based on the trigger start point in time and the trigger end point in time, and perform a fault injection attack based on the set trigger.

The memory 910 may be a volatile memory or a nonvolatile memory.

In addition, the processor 920 may execute a program and may control the computing apparatus 900. A program code executed by the processor 920 may be stored in the memory 910. The computing apparatus 900 may be connected to an external device, for example, a personal computer and a network, through an I/O device (not shown) and may exchange data. The computing apparatus 900 may be mounted to a server.

A fault injection attack method according to an example embodiment may alleviate an assumption of a fault injection attacker by replacing a conventional artificial trigger setting method that is practically difficult to apply, with an input/output signal of a crypto device that is practically easy to obtain.

One of ordinary skill in the art may easily understand that the methods and/or processes and operations described herein may be implemented using hardware components, software components, or a combination thereof based on the example embodiments. In addition, targets of technical solutions of the disclosure or portions contributing to the arts may be configured in a form of program instructions executable through various computer components and stored in non-transitory computer-readable recording media. The media may include, alone or in combination with the program instructions, data files, data structures, and the like. The program instructions recorded in the media may be specially designed and configured for the example embodiments or may be known to one of ordinary skill in the art of computer software and thereby available. Examples of the media may include magnetic media such as hard disks, floppy disks, and magnetic tapes; optical media such as CD-ROM discs, DVDs, and Blu-rays; magneto-optical media such as floptical disks; and hardware devices that are specially configured to store and perform program instructions, such as a ROM, a RAM, a flash memory, and the like. Examples of program instructions may include a higher language code computer-executable using an interpreter and the like as well as a machine language code and a bytecode, such as produced using structural programming languages such as C, object-oriented programming languages such as C++, and high or low programming languages (assembly languages, hardware technical languages, database programming languages and techniques), to run not only on one of the aforementioned devices but also a processor, a processor architecture, or a heterogeneous combination of combinations of different hardware and software components, or a machine capable of executing program instructions.

Therefore, according to an aspect of the disclosure, when the aforementioned methods and combinations thereof are performed by one or more computing apparatuses, the methods and the combinations thereof may be implemented as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform the operations associated with the aforementioned processes may include the aforementioned hardware and/or software components. Such all of the sequences and combinations associated with the processes are to be included in the scope of the disclosure.

For example, the described hardware devices may be to act as one or more software modules in order to perform processing according to the above-described example embodiments, or vice versa. The hardware devices may include a processor, such as, for example, an MPU, a CPU, a GPU, and a TPU, configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

While this disclosure is described with reference to specific matters such as components, some example embodiments, and drawings, they are merely provided to help general understanding of the disclosure and the disclosure is not limited to the example embodiments. It will be apparent to one of ordinary skill in the art that various alterations and modifications in forms and details may be made from the example embodiments.

Therefore, the scope of the disclosure is not defined by the example embodiments, but by the claims and their equivalents, and all variations within the scope of the claims and their equivalents are to be construed as being included in the disclosure.

Such equally or equivalently modified example embodiments may include, for example, logically equivalent methods capable of achieving the same results as those acquired by implementing the method according to the example embodiments. Accordingly, the disclosure and the scope thereof are not limited to the aforementioned example embodiments and should be understood as a widest meaning allowable by law.

What is claimed is:

1. A fault injection attack method performed by a computing apparatus, the fault injection attack method comprising:
    determining a trigger start point in time based on an input signal for a crypto device;
    determining a trigger end point in time based on an output signal of the crypto device;
    setting a trigger based on the trigger start point in time and the trigger end point in time;
    performing a fault injection attack based on the set trigger;
    communicating with the crypto device, the crypto device receiving the input signal of the plaintext from the computing apparatus; and
    performing the fault injection attack for the crypto device,
    wherein the trigger start point in time is determined as a point in time at which a plaintext is input to the crypto device, based on the input signal and the trigger end point in time is determined as a point in time at which a ciphertext is output from the crypto device based on the output signal, so that the trigger is set for an entire encryption operation of the crypto device,
    the trigger is set without modifying the internal code of the crypto device based on the connection between the computing apparatus and the crypto device,
    wherein a target operation that is a target of the fault injection attack is determined based on an analysis for electromagnetic trace emitted in a process in which the crypto device performs encryption,
    wherein the analysis for electromagnetic trace is performed based on a simple power analysis (SPA),
    wherein the setting of the trigger comprises setting the trigger based on a jump connection for a connection between the computing apparatus and the crypto device,
    wherein the performing of the fault injection attack comprises recovering a secret key based on an XOR operation between a normal ciphertext and a fault-injected erroneous ciphertext,
    wherein the recovering comprises recovering the secret key by performing an analysis on a number of all cases related to a position at which a fault is likely to be injected for each fault type,
    wherein the fault type is determined based on a position at which a fault is propagated according to an encryption operation.

2. A non-transitory computer-readable record medium storing a program including instructions that cause the computing apparatus to perform the fault injection attack method of claim 1.

3. A computing apparatus to perform a fault injection attack, the computing apparatus comprising:
    a communication interface; and
    a processor circuitry,
    wherein the processor circuitry is configured to determine a trigger start point in time based on an input signal for a crypto device, determine a trigger end point in time based on an output signal of the crypto device, set a trigger based on the trigger start point in time and the trigger end point in time, and perform a fault injection attack based on the set trigger,
    wherein the trigger start point in time is determined as a point in time at which a plaintext is input to the crypto device, based on the input signal and the trigger end point in time is determined as a point in time at which a ciphertext is output from the crypto device based on the output signal, so that the trigger is set for an entire encryption operation of the crypto device, the trigger is set without modifying the internal code of the crypto device based on the connection between the computing apparatus and the crypto device,
    wherein a target operation that is a target of the fault injection attack is determined based on an analysis for electromagnetic trace emitted in a process in which the crypto device performs encryption,
    wherein the analysis for electromagnetic trace is performed based on a simple power analysis (SPA),
    wherein the processor circuitry is configured to set the trigger based on a jump connection for a connection between the computing apparatus and the crypto device,
    wherein the processor circuitry is configured to recover a secret key based on an XOR operation between a normal ciphertext and a fault-injected erroneous ciphertext, wherein the processor circuitry is configured to recover the secret key by performing an analysis on a number of all cases related to a position at which a fault is likely to be injected for each fault type,
    wherein the fault type is determined based on a position at which a fault is propagated according to an encryption operation,
    wherein the processor circuitry is configured to communicate with the crypto device via the communication interface such that the crypto device receives the input signal of the plaintext from the computing apparatus,
    wherein the computing apparatus performs the fault injection attack for the crypto device.

* * * * *